United States Patent
Zhang et al.

(10) Patent No.: US 11,265,099 B1
(45) Date of Patent: Mar. 1, 2022

(54) SYSTEM AND METHODS FOR TIME AND FREQUENCY DIVISION PASSIVE OPTICAL NETWORK

(71) Applicant: CABLE TELEVISION LABORATORIES, INC, Louisville, CO (US)

(72) Inventors: Junwen Zhang, Broomfield, CO (US); Zhensheng Jia, Superior, CO (US); Mu Xu, Broomfield, CO (US); Haipeng Zhang, Broomfield, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/877,439

(22) Filed: May 18, 2020

Related U.S. Application Data

(60) Provisional application No. 62/849,737, filed on May 17, 2019.

(51) Int. Cl.
*H04J 14/00* (2006.01)
*H04J 14/02* (2006.01)

(52) U.S. Cl.
CPC ........ *H04J 14/0282* (2013.01); *H04J 14/025* (2013.01); *H04J 14/0246* (2013.01); *H04J 14/0247* (2013.01)

(58) Field of Classification Search
CPC ............... H04J 14/0282; H04J 14/0246; H04J 14/0247; H04J 14/025
USPC .......................................................... 398/72
See application file for complete search history.

(56) References Cited

U.S. PATENT DOCUMENTS

2012/0294614 A1* 11/2012 Cvijetic ............. H04J 14/0282
398/67

* cited by examiner

*Primary Examiner* — Mohammad R Sedighian
(74) *Attorney, Agent, or Firm* — Armstrong Teasdale LLP

(57) ABSTRACT

A coherent passive optical network includes a downstream transceiver and first and second upstream transceivers in communication with an optical transport medium. The downstream transceiver includes a downstream processor for mapping a downstream data stream to a plurality of sub-bands, and a downstream transmitter for transmitting a downstream optical signal modulated with the plurality of sub-bands. The first upstream transceiver includes a first local oscillator (LO) for tuning a first LO center frequency to a first sub-band of the plurality of sub-bands, and a first downstream receiver for coherently detecting the downstream optical signal within the first sub-band. The second upstream transceiver includes a second downstream receiver configured for coherently detecting the downstream optical signal within a second sub-band of the plurality of sub-bands. The downstream processor dynamically allocates the first and second sub-bands to the first and second transceivers in the time and frequency domains.

18 Claims, 9 Drawing Sheets

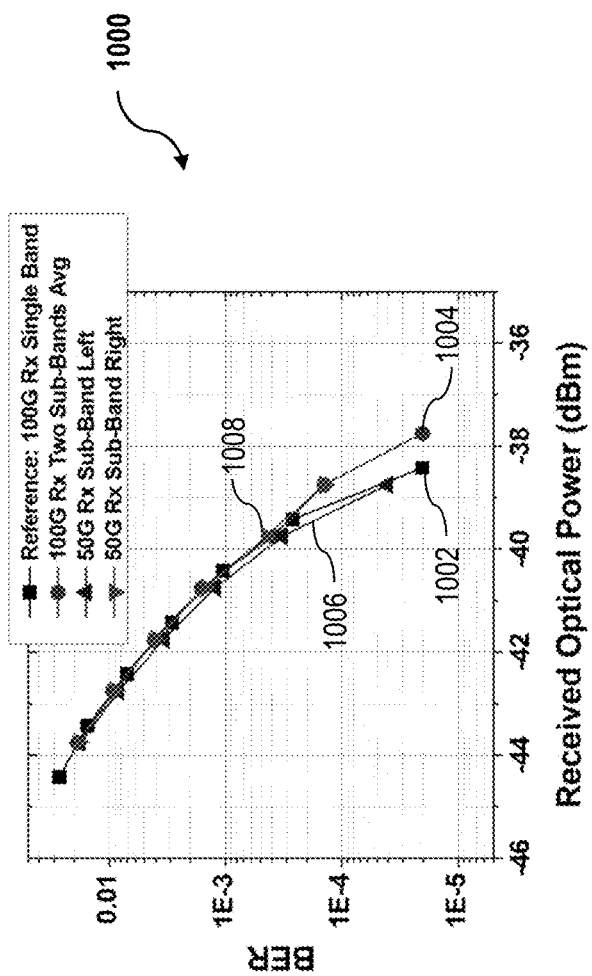
FIG. 10
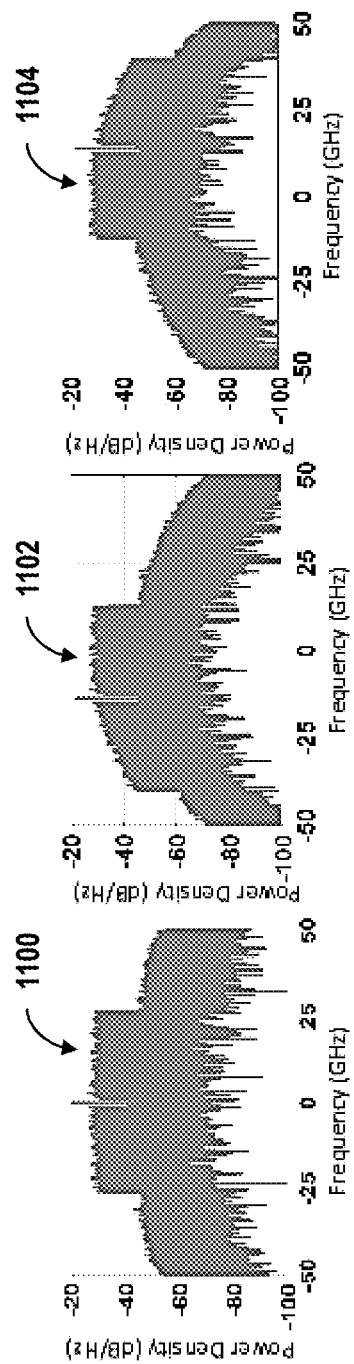
FIG. 11A
FIG. 11B
FIG. 11C

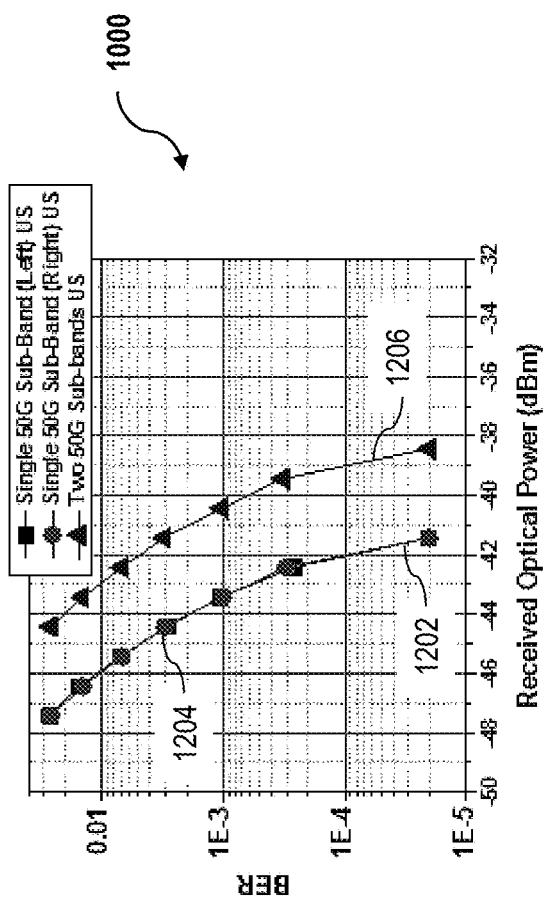
FIG. 12
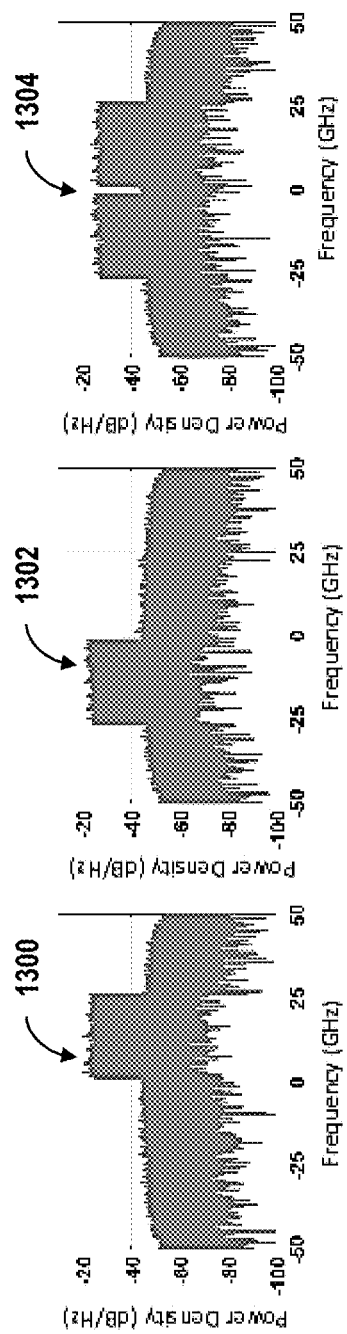
FIG. 13A
FIG. 13B
FIG. 13C

SYSTEM AND METHODS FOR TIME AND FREQUENCY DIVISION PASSIVE OPTICAL NETWORK

CROSS REFERENCE TO RELATED APPLICATIONS

This application claims the benefit of and priority to U.S. Provisional Patent Application Ser. No. 62/849,737, filed May 17, 2019, which is incorporated herein by reference in its entirety.

BACKGROUND

The field of the disclosure relates generally to fiber communication networks, and more particularly, to access networks for transmitting coherent optical signals.

Bandwidth requirements in optical access networks have grown tremendously in recent years, due to rapidly increasing demand from new business and technology drivers, such as mobile Internet, 5G, cloud computing and networking, high bandwidth video streaming services, "big data," social media, Internet of Things (IoT), and mobile data delivery. In conventional access networks, the passive optical network (PON) has become a dominant architecture to meet such end user high capacity demand in point-to-multipoint (P2MP) systems, as evidenced by the recently-developing standards in next generation (NG) high speed time-division multiplexing PON (TDM-PON) standards.

To further improve the data rate and bandwidth capacity of the access network, coherent TDM-PON and coherent wavelength-division-multiplexing (WDM)-PON/ultra-dense WDM-PON solutions have been proposed and reported for NG access networks. In particular, recent high-speed (i.e., greater than a 100G data rate) TDM-PON coherent detection proposals offer high-speed data transmission capability with advanced modulation formats, while also enhancing the link power budget due to the increased sensitivity of the coherent technology. Coherent detection technology in the PON paradigm demonstrate improved receiver sensitivity through coherent beating of the transmission signal with a clean local oscillator (LO) signal. In comparison with WDM-PON, high-speed coherent TDM-PON solutions based on a single wavelength achieve better statistical multiplexing for bandwidth sharing and transparent signal transmission with colorless components, which results in a simplified deployment, lowered operating expense (OPEX), and saved wavelength resources.

A typical conventional coherent detection-based TDM PON system, however, requires symmetrical hardware complexity at both the central office (e.g., an Optical Line Terminal (OLT)) and the end-device of the end user (e.g., an Optical Network Unit (ONU)) to achieve this statistical multiplexing gain. That is, the conventional ONUs must have the same transceiver bandwidth as the conventional OLT. For example, a conventional 100G TDM-PON system requires a 100G transmitter at the OLT-side and a 100G receiver at the ONU-side for downstream transmission from the OLT to the ONU. If the system supports coherent 100G transmission in the downstream and the upstream directions, then a symmetrical 100/100G PON requires 100G coherent transceivers (Co-TRx) at both the OLT and ONU side. A conventional symmetrical 100/100G TDM-PON system is described further below with respect to FIG. 1.

FIG. 1 is a schematic illustration of a conventional TDM-PON system 100. In the example depicted in FIG. 1, system 100 is a conventional coherent TDM-PON having symmetrical 100G capacity. System 100 includes a centralized OLT 102, a splitter 104 (e.g., a passive or power splitter/combiner), and a plurality of ONUs 106 (four ONUs 106(1-4), in this example), which may be further in communication with a plurality of users or customer premises (not shown). OLT 102 is in communication with splitter 104 over one or more optical fibers 108, and is typically located within a central office, a communications hub, or a headend of an optical link (not shown), and functions to convert standard signals from a service provider (not shown) to the frequency and framing used by system 100, and also for coordinating multiplexing between conversion devices on ONUs 106. Because system 100 is a symmetrical 100/100G PON, each ONU 106 is configured for 100G Co-TRx capability, and OLT 102 includes at least one 100G OLT coherent transceiver 110. System 100 though, as a coherent PON working only in TDM mode, is challenged by two particular disadvantages: (1) limited resource allocation capability; and (2) considerably high cost for implementation.

With respect to resource allocation, because the TDM-PON only supports time domain bandwidth allocation, the flexibility of resource allocation is limited. Therefore, it has been desirable to be able to divide the total bandwidth into multiple sub-bands in order for the system to support more flexible bandwidth allocation, such as from WDM techniques. However, full WDM suffers colorful components in distribution networks and lacks statistical multiplexing gain. A hybrid combination of TDM, WDM, and TWDM techniques have been recently introduced in an NG-PON2 system. This hybrid system, however, still requires colorful components (i.e., similar to full WDM), and therefore multiple lasers sources and multiple transceivers to achieve bandwidth bundling and sharing over 10G. This hybrid PON thus adds additional, and undesirable, complexity to both the ONU and OLT. Accordingly, there is a need for improved PON architectures and techniques that efficiently utilize the advantages of time and frequency division multiplexing for bandwidth allocation, but without suffering the disadvantages of either technique.

With respect to the system cost, a 100G coherent transceiver is considered to be a very expensive hardware component at the ONU-side, particularly where an end-user desires only relatively small bandwidth or low bandwidth tier services. The conventional symmetrical 100/100G PON configuration, however, still requires a 100G transceiver for each end user sharing the total 100G bandwidth with other users. Thus, there is no cost difference for end-user devices among the multiple different subscribers; the cost of the ONU for the lowest-tier service subscriber is the same as the cost to the highest-tier subscribers, irrespective of the different services. For example, a 2.5G, 5G, or 10G bandwidth subscriber to the 100/100G PON still requires a 100G transceiver ONU to share the total 100G bandwidth.

Accordingly, given that the PON paradigm is very sensitive to cost, and that the cost of the ONUs in a P2MP PON system dominates the total hardware cost, there is also a need for lower cost solutions that enable flexible bandwidth sharing.

SUMMARY

In an embodiment, a coherent passive optical network (PON) includes a downstream transceiver, first and second upstream transceivers, and an optical transport medium in operable communication with the downstream transceiver and first and second upstream transceivers. The downstream transceiver includes a downstream processor for mapping a downstream data stream to a plurality of sub-bands, and a downstream transmitter for transmitting a downstream optical signal modulated with the plurality of sub-bands. The first upstream transceiver includes a first local oscillator (LO) for tuning a first LO center frequency to a first sub-band of the plurality of sub-bands, and a first downstream receiver for coherently detecting the downstream optical signal within the first sub-band. The second upstream transceiver includes a second downstream receiver configured for coherently detecting the downstream optical signal within a second sub-band of the plurality of sub-bands. The downstream processor dynamically allocates the first and second sub-bands to the first and second transceivers in both of the time and frequency domains.

In an embodiment, a coherent optical transmitter includes a laser source, a data source having a data stream, a processor, and a modulator. The processor includes a serial-to-parallel converter for converting the data stream into a plurality of parallel data streams, a modulation mapping unit configured to code and map each of the plurality of parallel data streams to a constellation of a modulation format to generate a plurality of modulated data streams, a sub-band mapping unit configured to map each of the plurality of modulated data streams to a respective sub-band modulation spectrum from a plurality of frequency sub-bands to generate a plurality of sub-band data signals, and a digital-to-analog converter configured to combine the plurality of sub-band data signals and generate a combined analog sub-band output of processed data. The modulator is configured to modulate the combined analog sub-band output of processed data with the laser source to generate a modulated optical signal for transmission over an optical transport medium.

BRIEF DESCRIPTION

These and other features, aspects, and advantages of the present disclosure will become better understood when the following detailed description is read with reference to the accompanying drawings in which like characters represent like parts throughout the drawings, wherein:

FIG. 10 is a graphical illustration depicting a comparative results plot of downstream receiver sensitivity for the optical network units depicted in FIG. 8.

Figure 8:
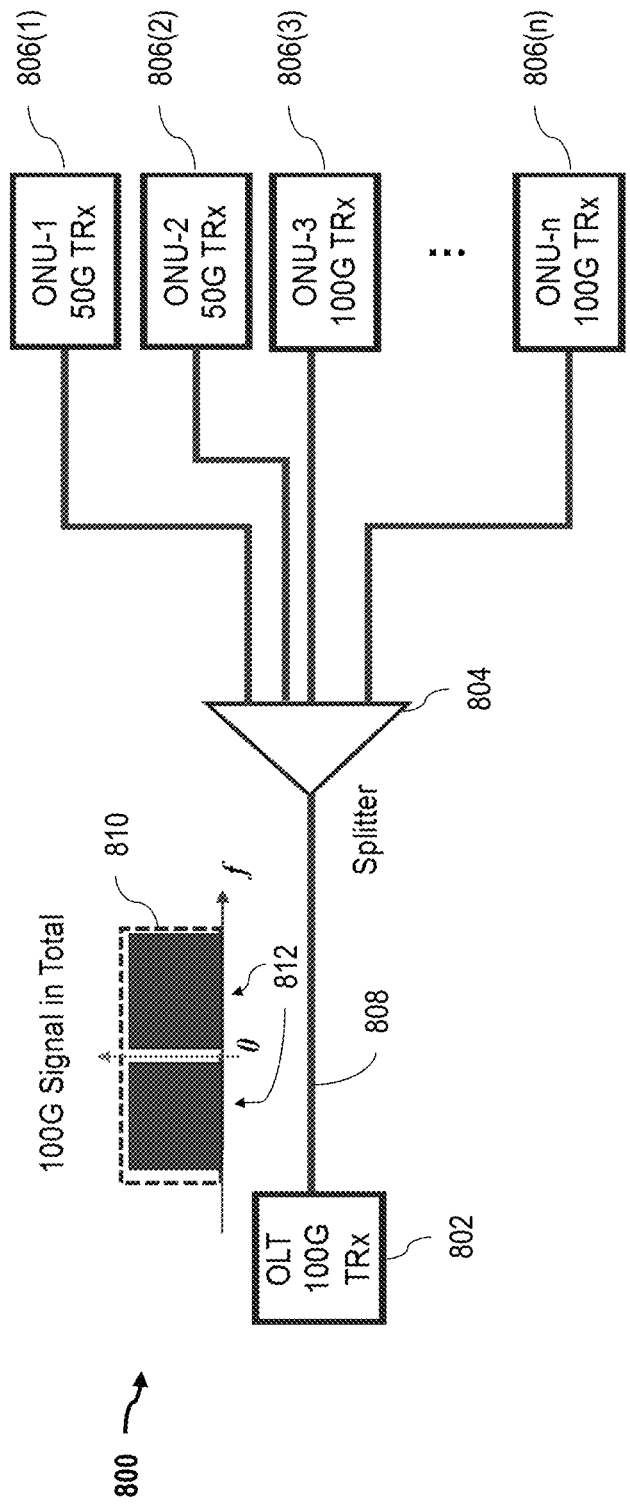
FIG. 8 is a schematic illustration of an exemplary simulation model of a coherent time and frequency division multiplexing passive optical network.

FIGS. 11A-C are graphical illustrations depicting detected signal spectrum plots for the optical network units depicted in FIG. 8.

Figure 7:
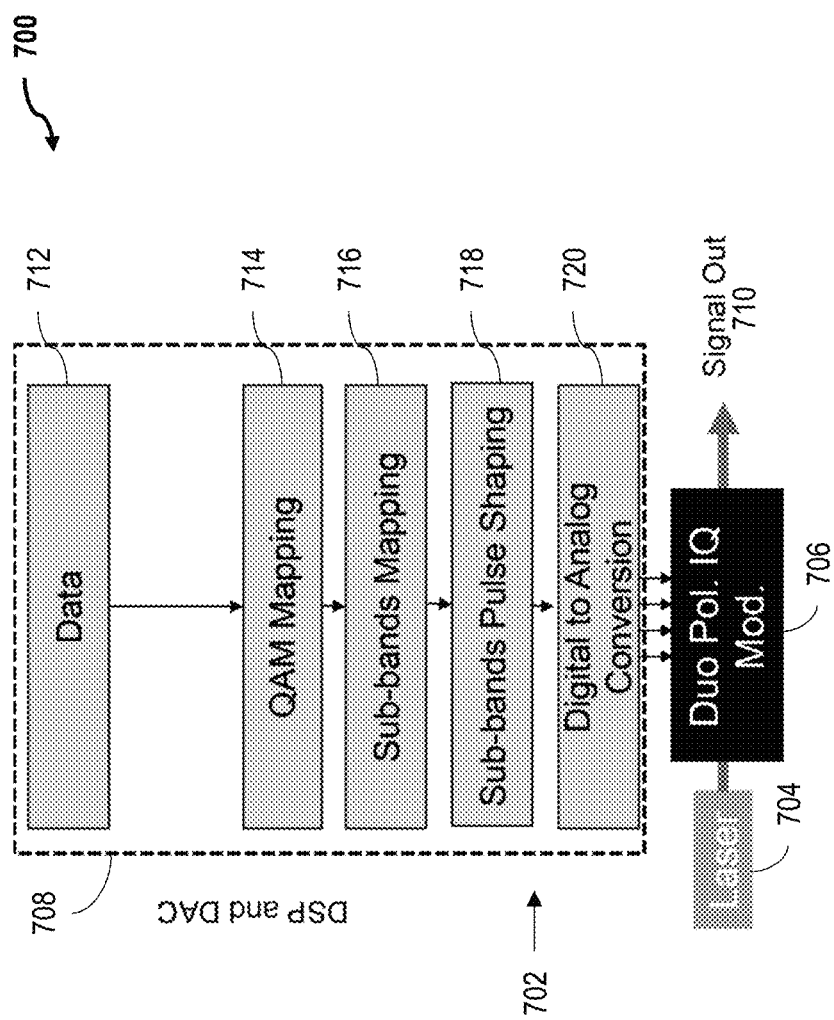
FIG. 7 is a schematic illustration of a single sub-band modulation scheme for a transmitter of the optical network units depicted in FIG. 2.

FIG. 12 is a graphical illustration depicting a comparative results plot of receiver sensitivity for upstream detected signals from the optical network units depicted in FIG. 7.

FIGS. 13A-C are graphical illustrations depicting respective detected signal spectrum plots for the upstream detected signals depicted in FIG. 11.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, "modem termination system" (MTS) refers to a termination unit including one or more of an Optical Network Terminal (ONT), an optical line termination (OLT), a network termination unit, a satellite termination unit, a cable modem termination system (CMTS), and/or other termination systems which may be individually or collectively referred to as an MTS.

As used herein, "modem" refers to a modem device, including one or more a cable modem (CM), a satellite modem, an optical network unit (ONU), a DSL unit, etc., which may be individually or collectively referred to as modems.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

Exemplary systems and methods for coherent PON solutions are described herein. In an exemplary embodiment, an innovative coherent PON solution effectively implements coherent time and frequency division multiplexing TFDM for the exemplary PON (coherent TFDM-PON) based on multiplexing of sub-bands. The present coherent TFDM-PON supports asymmetric ONU/OLT hardware configurations, and also pay-as-you-go ONU costs based on the relevant bandwidth subscription, which represent significant improvements over conventional TDM and WDM PONs, as well as recent hybrids thereof.

The present embodiments differ from conventional WDM-PONs and TWDM-PONs, in that the OLT and ONUs of the TFDM-PON described herein may be configured to operate at the same wavelength grid with a small frequency tuning. The systems and methods herein advantageously utilize wavelength selection capabilities of coherent detection to eliminate the need for optical filtering or wavelength selective components for frequency selection. The coherent TFDM-PON systems and methods described herein support more flexible bandwidth sharing in both the time and frequency domains, and therefore realize significant advantages over conventional techniques for flexibly assigning which user occupies which channels utilizing coherent optics tunability and frequency selectivity.

The present coherent TFDM-PON is further advantageous over conventional PON systems in that it is fully compatible with the widely deployed conventional TDM-PON, and also will work using a power splitter-based optical distribution network (ODN) without need for colorful components. A TFDM-PON according to the present embodiments need only one transceiver at the OLT-side for a transceiver at the ONU-side and, by using frequency division multiplexing, the overall scheduling latency in the coherent TFDM-PON system is significantly lower than in the TDM-PON. An exemplary coherent TFDM-PON is described further below with respect to FIG. 2.

Figure 1:
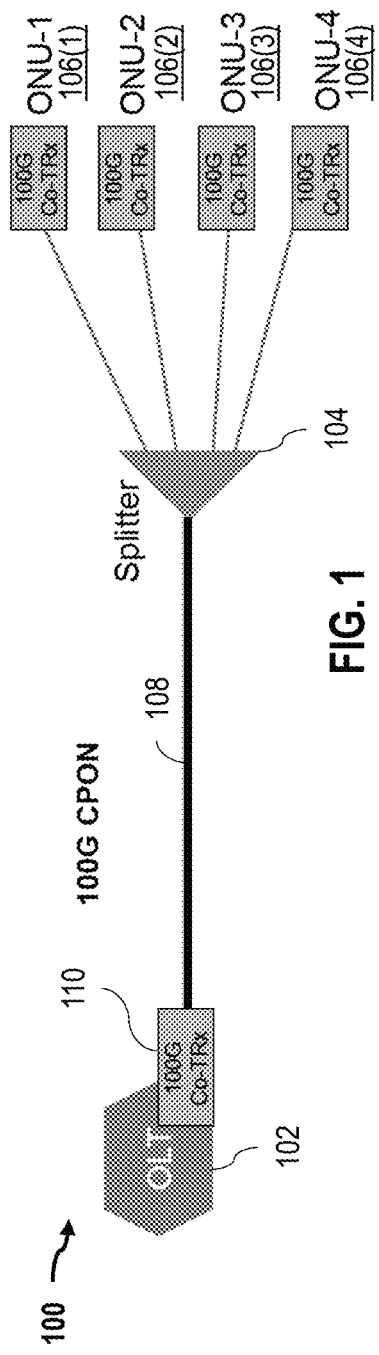
FIG. 1 is a schematic illustration of a conventional time-division multiplexing passive optical network system.
Figure 2:
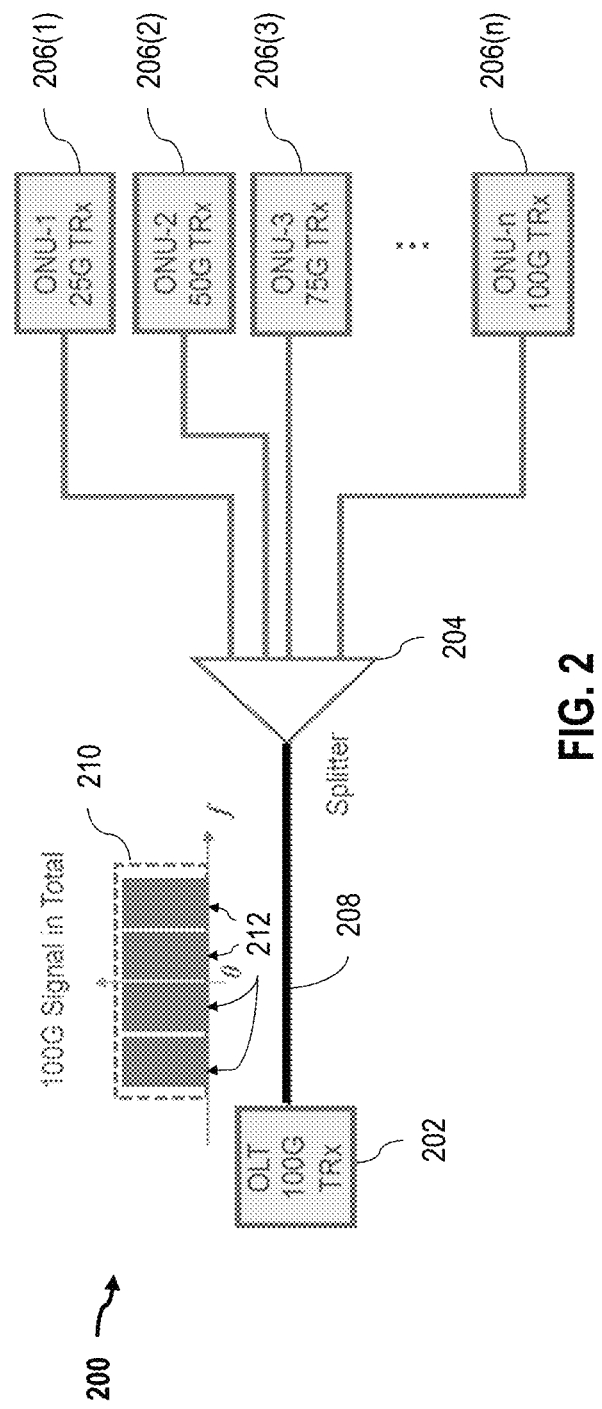
FIG. 2 is a schematic illustration of an exemplary coherent time and frequency division multiplexing passive optical network system.

FIG. 2 is a schematic illustration of an exemplary coherent TFDM-PON system 200. Coherent TFDM-PON system 200 is similar to TDM-PON system 100, FIG. 1, in general architectural configuration, and includes a central OLT transceiver 202, a splitter 204, and a plurality of ONUs 206 (1-n ONUs 106(1-n), where n=4 in this example). System 200 differs, however, from system 100, in that each of ONUs 206 is of a different type from one another. That is, in this example, ONU 206(1) is depicted as a 25G transceiver, ONU 206(2) as a 50G transceiver, ONU 206(3) as a 75G transceiver, and ONU 206(n) as a 100G transceiver.

A system according to the embodiment depicted in FIG. 2 is advantageously capable to significantly reduce the overall cost of the coherent PON by utilizing different types of ONUs among the plurality of end users in the network. In this example, system 200 is a 100G coherent PON, and in exemplary operation, OLT 202 is in communication with splitter 204 over an optical transport medium 208 (e.g., a single mode fiber (SMF)), and transmits a 100G downstream (DS) signal 210, which may be modulated with N sub-bands 212 (4 sub-bands illustrated in FIG. 2) each having a bandwidth equal to 1/N of the total bandwidth. At the ONU-side, each of ONUs 206 may detect one or more of sub-bands 212 depending on the receiver bandwidth of that particular ONU transceiver 206. For example, a low-bandwidth tier subscriber may be able to detect only one of the N sub-bands 212. Subscribers having larger bandwidth ONU receivers would be more likely able to detect multiple sub-bands 212. Upstream (US) transmission from transmitters (not separately shown) of ONUs 206 may operate similarly.

According to the exemplary embodiment depicted in FIG. 2, downstream signal 210 has a total bandwidth of 100G, which is divided into four sub-bands 212. The four ONUs 206, of different ONU types, receive sub-bands 212 the hardware bandwidth of the respective ONU receiver. For example, a 25G ONU (e.g., ONU 206(1)) may have a transceiver supporting a 25 Gbps data rate, and the required bandwidth for 25G ONU transceivers is only 6.25 GHz. A 50G ONU (e.g., ONU 206(1)), on the other hand, would require a 12.5 GHz bandwidth, whereas a 100G ONU (e.g., ONU 206(4)) would require a 25 GHz bandwidth.

Exemplary architectures of coherent PON architectures, as well as the respective components thereof, are described in greater detail in U.S. Pat. Nos. 9,912,409, 10,200,123, and co-pending U.S. patent application Ser. No. 15/609,461, filed May 31, 2017, to the present inventors, the disclosures of all of which are incorporated by reference herein.

Figure 3:
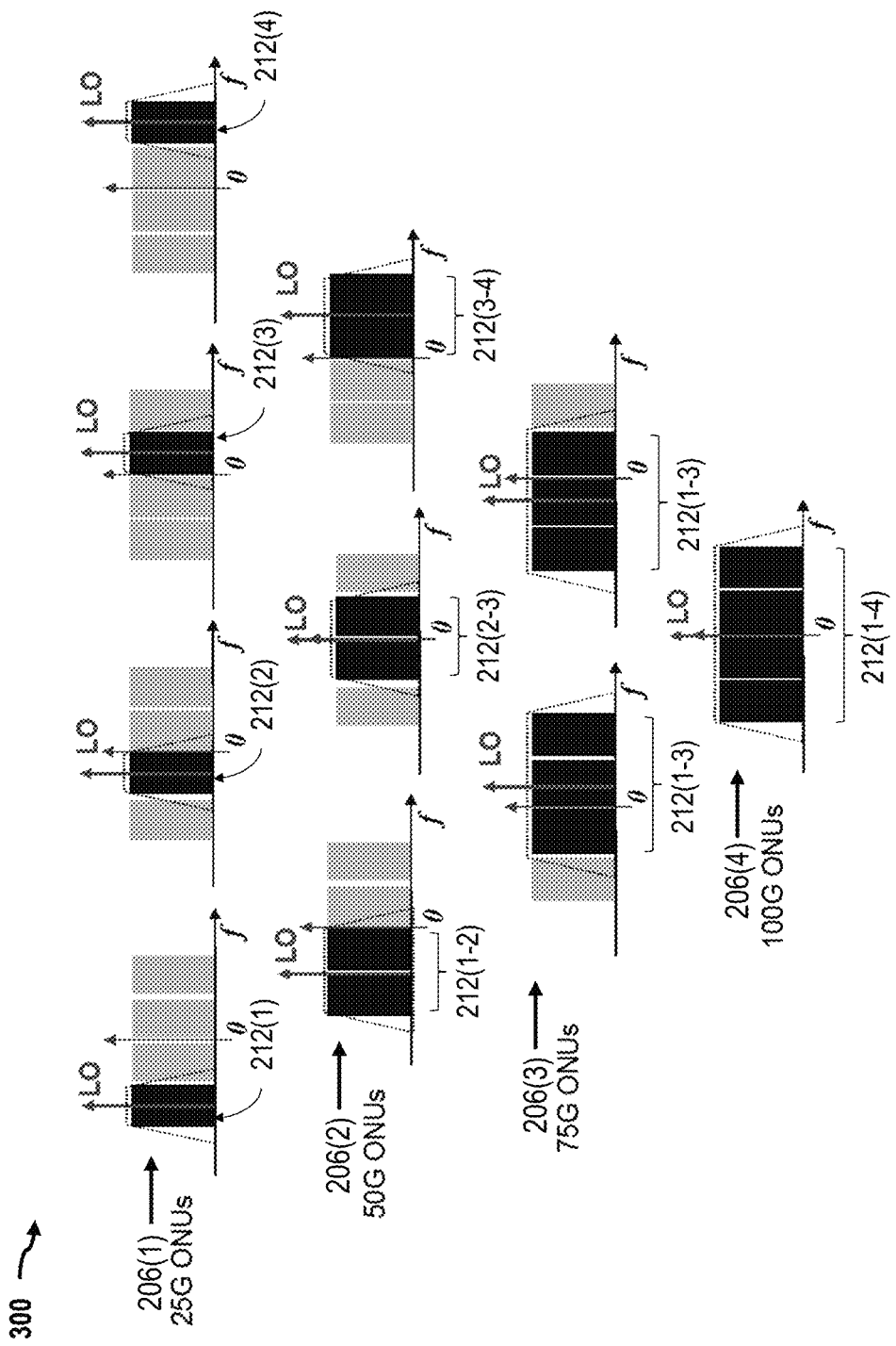
FIG. 3 depicts an allocation scheme for frequency resources and local oscillators in the system depicted in FIG. 2.

FIG. 3 depicts an allocation scheme 300 for frequency resources and LOs in system 200, FIG. 2. In an exemplary embodiment, scheme 300 illustrates the frequency resource and corresponding LO allocations in the 100G coherent TFDM-PON of system 200 with respect to sub-bands 212 (i.e., four adjacent DS sub-bands 212(1), 212(2), 212(3), 212(4)). For ease of illustration, the "0" frequency represents the base frequency corresponding to the wavelength grid for the downstream or upstream transmissions, and the coherent TFDM-PON is capable of supporting 25G, 50G, 75G and 100G ONUs (i.e., ONUs 206(1), 206(2), 206(3), and 206(4), respectively).

Accordingly, in this example, the low-speed 25G ONU case (i.e., ONU 206(1)) may utilize any of the four sub-bands 212(1-4) as the frequency resource to allocate. The respective LO and carrier may thus be tuned to the center frequency of the particular sub-band 212 utilized, thereby providing four different allocation options for the 25G ONU in scheme 300. Similarly, for the 50G ONU case (i.e., ONU 206(2)), two adjacent sub-bands 212 may be used for resource allocation, thereby providing three different allocation options for the 50G ONU (e.g., sub-bands 212(1-2), sub-bands 212(2-3), or sub-bands 212(3-4)). In contrast, the 75G ONU case (i.e., ONU 206(3)) provides two resource allocation options (e.g., sub-bands 212(1-3) or sub-bands 212(2-4)), whereas the 100G ONU case (i.e., ONU 206(4)) provides only one resource allocation option (e.g., sub-bands 212(1-4)), since all four sub-bands 212 are occupied.

System 200 and scheme 300 are described with respect to four sub-bands 212, but this number is provided for purposes of illustration, and not in a limiting sense. The person of ordinary skill in the art will appreciate, after reading and comprehending the present application, that the principles described herein are applicable to coherent TFDM-PON systems utilizing any number of sub-bands. Additionally, although the number of sub-bands may be any number, in practice, it may be desirable to balance the flexibility of frequency multiplexing with the additional complexity caused by fine divisions in frequency bands. For example, as explained further below with respect to FIG. 7, in some cases, there may be only two sub-bands to support two different types of ONU (e.g., 50G and 100G ONUs).

The particular sub-band division schemes depicted in FIGS. 2 and 3 are also provided for illustrative purposes, and not in a limiting sense. The systems and methods described herein are also applicable to other possible frequency sub-band division schemes. Furthermore, although the present embodiments are particularly advantageous to a PON deploying multiple types of ONUs in the same network, the innovative TDFM-PON of the present disclosure is fully applicable to a network using only one type of ONU (e.g., only 100G ONUs in a multiple sub-band TFDM-PON). Such a TDFM-PON would still realize significant improvements, in comparison with conventional PONs, in realizing more flexible TFDM bandwidth allocation.

More particularly, in comparison with conventional coherent PONs, the present coherent TFDM-PON system enables more flexible bandwidth sharing in both the time and frequency domains. Utilizing the improved tunability and frequency selectivity of coherent optics, the present embodiments advantageously enable the system to flexibly assign which user occupies which channels, to realize more effect load balancing and/or power saving capabilities. In exemplary operation, the improved load balancing functionality of system 200 enables subscribers to utilize a particular channel at one time one channel, and a different channel at another time, such as in the case where traffic patterns may prompt the subscriber to jump to another channel. Further to this exemplary operation, even in the case of a subscriber transmitting using all channels (e.g., 100G ONU 206(4), FIGS. 2-3), the present embodiments enable the subscriber to transmit using only a single channel, or fewer than all channels, to save power.

According the innovative features and flexibility of system 200, still further improvements are realized over the conventional systems and techniques, including without limitation, the ability to utilize, for some or all of the different channels, different forward error correction (FEC) techniques, different modulation formats, and different Media Access Control (MAC) layer functions. For example, in system 200, the respective sub-channels may be allocated such that the sub-channels are independent of one another. Accordingly, each sub-channel may utilize a different FEC to prevent the codeword from going across channels. In this manner, system 200 is able to decode each of the channels independently.

OLT Transmitter

Figure 4:
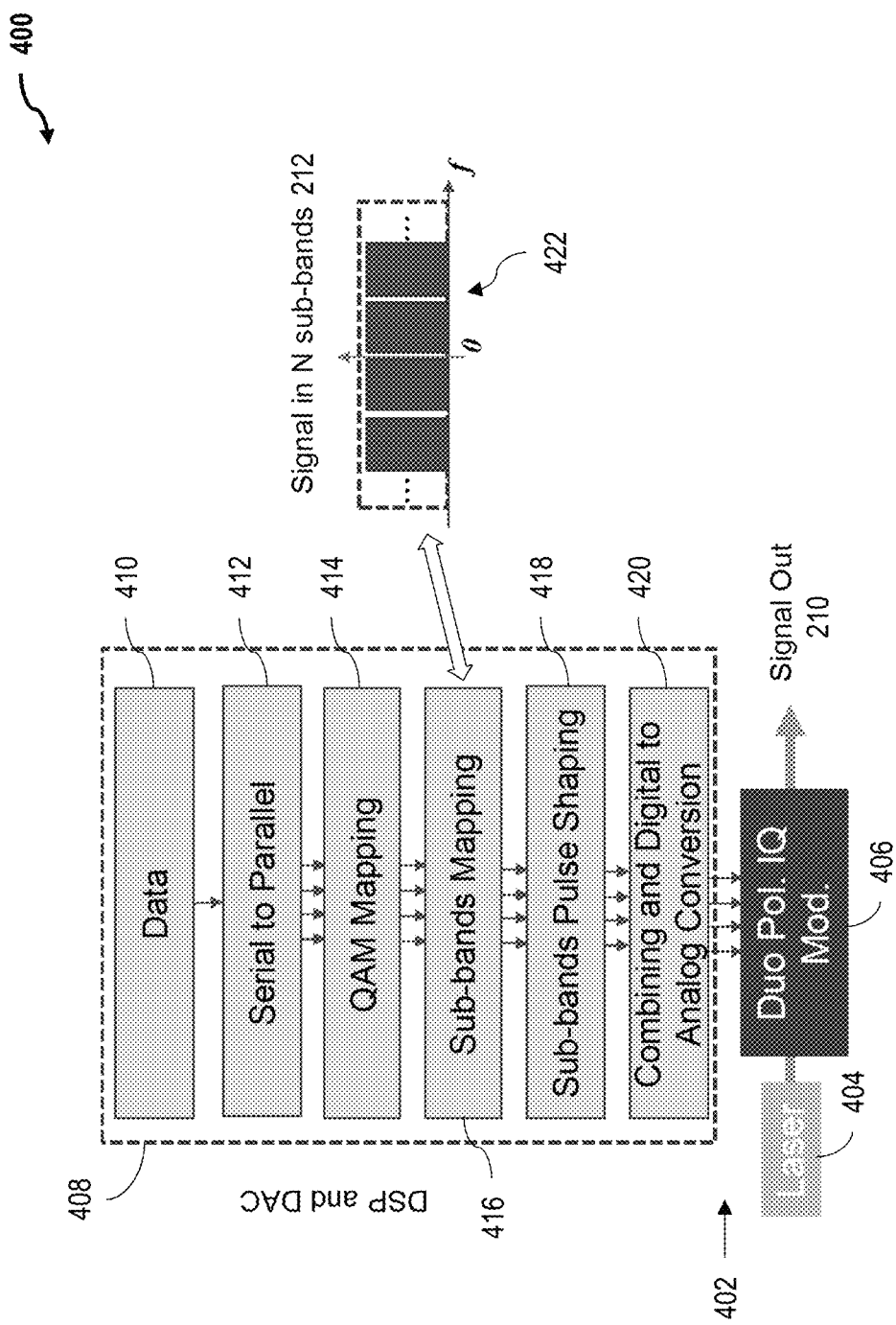
FIG. 4 is a schematic illustration of a modulation scheme for a transmitter of the optical line terminal depicted in FIG. 2.

FIG. 4 is a schematic illustration of a modulation scheme 400 for a transmitter 402 of OLT 202, FIG. 2. Transmitter 402 includes a laser source 404, a modulator 406, and a processor 408 to output downstream signal 210. In general hardware configuration, transmitter 402 of the present coherent TFDM-PON is similar to that of a conventional TDM-based coherent PON. In particular, the bandwidth of both coherent transceivers may be the same in operation. The signal generation processing of transmitter 402 though, is significantly different from conventional techniques.

In the exemplary embodiment, processor 408 includes a data source 410, a serial-to-parallel converter 412, a first mapping unit 414, a second mapping unit 416, a pulse shaping unit 418, and a digital-to-analog converter (DAC) 420. In exemplary operation of processor 408, assuming that system 200 utilizes N sub-bands, the data from data source 410 is transformed by serial-to-parallel converter 412 from a serial data stream to N parallel data streams. Each of N parallel data streams may then be coded and mapped to QAM constellations by first mapping unit 414, and then modulated and mapped to N sub-bands by second mapping unit 416 corresponding to an N sub-band modulation spectrum 422. For each sub-band 212, the modulation format may, for example, be for a single carrier modulation or multi-carrier modulations, such as orthogonal frequency division multiplexing (OFDM) or discrete multi-tone (DMT).

In further exemplary operation, pulse shaping unit 418 applies sub-band pulse shaping to an output of second mapping unit 416, that is, after sub-band mapping, to reduce crosstalk between sub-bands. In an embodiment, pulse shaping unit 418 applies one or more pulse shaping digital filters, including without limitation raised cosine filters for square root raised cosine filters. DAC 420 then combines the sub-bands output from pulse shaping unit 418, and then converts the respective signals from the digital domain to analog domain for optical signal modulation by modulator 406. In an embodiment, modulator 406 is a dual polarization I/Q modulator. For illustration purposes, the several N sub-bands 212 are shown to have substantially equal bandwidths to one another. Nevertheless, person of ordinary skill in the art will understand that one or more of the several sub-bands 212 may have different bandwidths from other sub-bands without departing from the scope of the embodiments herein.

ONU Receivers

Figure 5:
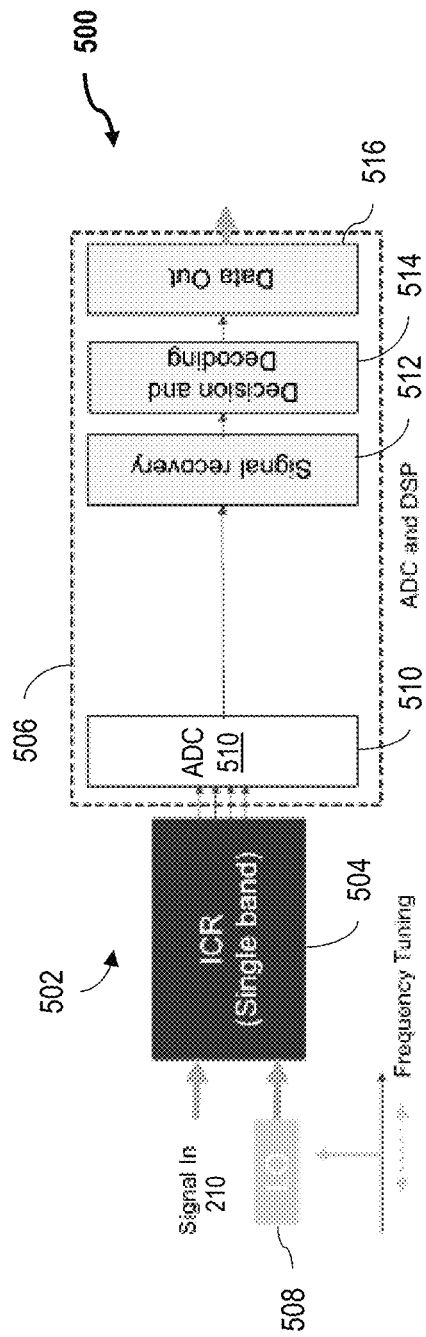
FIG. 5 is a schematic illustration of a single band detection and signal recovery scheme for a receiver of the optical network units depicted in FIG. 2.

FIG. 5 is a schematic illustration of a single band detection and signal recovery scheme 500 for a receiver 502 of ONUs 206, FIG. 2. Receiver 502 includes an integrated coherent receiver (ICR) portion 504, a processor 506, and an LO 508. In an exemplary embodiment, ICR portion 504 is configured as a single-band receiving unit capable of detecting one sub-band 212 of downstream signal 210, and processor 506 includes one or more of an analog-to-digital converter (ADC) 510, a signal recovery unit 512, a decision and decoding unit 514, and a data output portion 516.

In exemplary operation, a center frequency of LO 508 is tuned to the target sub-band 212 such that ICR portion 504 may coherently detect the targeted signal. Once detected, the target signal is converted by ADC 510, and then processed for signal recovery and decision by signal recovery unit 512 and decision and decoding unit 514, respectively. Thus, through utilization of coherent frequency selectivity, which is a property unique to coherent detection, receiver 502 is advantageously capable of filtering out the target sub-band using only a passive filter (e.g., a low-pass filter, bandpass filter, etc.). In the embodiment depicted in FIG. 5, since only one sub-band is detected, receiver 502 may be configured for a detection bandwidth of only one sub-band. In other words, in the case of a small-bandwidth subscriber needing to detect one sub-band, receiver 502 will be sufficiently configured with only 1/N of the full receiver bandwidth (e.g., 100G).

Exemplary scheme 500 therefore illustrates the case for an ONU that only detects one sub-band. Nevertheless, as described above, the present systems and methods efficiently enable the coherent TFDM-PON to utilize ONU-side receivers of different types within the same network, that is, depending on the network structure. An exemplary embodiment for an ONU-side receiver configured to detect multiple sub-bands is described further below with respect to FIG. 6.

Figure 6:
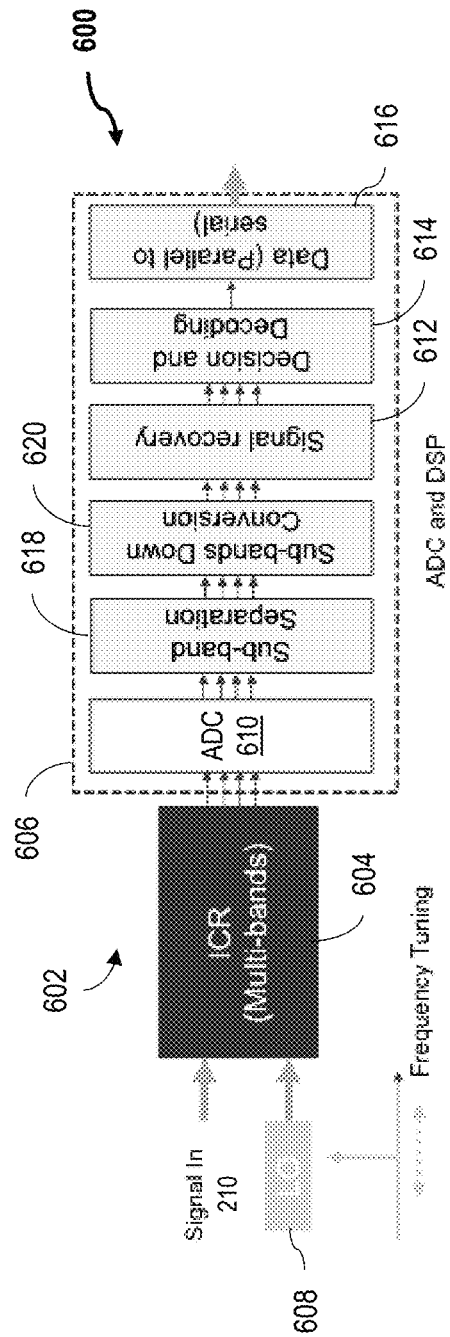
FIG. 6 is a schematic illustration of a multi-band detection and signal recovery scheme for a receiver of the optical network units depicted in FIG. 2.

FIG. 6 is a schematic illustration of a multi-band detection and signal recovery scheme 600 for a receiver 602 of ONUs 206, FIG. 2. Scheme 600 is similar to scheme 500, FIG. 5, and includes an ICR portion 604, a processor 606, and an LO 608. Scheme 600 differs though, from scheme 500, in that ICR portion 604 is configured as a multi-band receiving unit capable of detecting multiple sub-bands 212 of downstream signal 210. Processor 606, similarly to processor 506, FIG. 5, includes an ADC 610, a signal recovery unit 612, a decision and decoding unit 614, and a data output portion 616. Processor 606 differs from processor 506 though, in that processor 606 additionally includes a sub-band separation unit 618 and a sub-band down conversion unit 620. Additionally, data output portion 616 is configured for parallel-to-serial conversion of the output data streams.

Accordingly, in the case of a large-bandwidth subscriber, scheme 600 implements receiver 602 to be configured to have a large detection bandwidth for detecting the multiple sub-bands. According to the advantageous configuration of receiver 602, scheme 600 enables the detection of the multiple sub-bands using only one ICR (i.e., ICR portion 604). Digital signal processing by processor 606 otherwise operates similarly to processor 506, except that after conversion by ADC 610, sub-band separation and down conversion, by sub-band separation unit 618 and sub-band down conversion unit 620, respectively, may be desired for parallel sub-band processing. According to scheme 600, for an ONU desiring to detect K sub-bands, the required bandwidth for signal detection and data processing in receiver 602 need only be K/N of the full bandwidth (100G, in this example).

OLT Receiver

In an exemplary embodiment, a receiver (not separately shown) for OLT 202, FIG. 2, may be configured and operated similarly to ONU receiver 602 and scheme 600. Nevertheless, because OLT 202 has the capability to detect all sub-bands, the corresponding OLT receiver is assumed to be a full bandwidth coherent receiver (i.e., K=N). However, in the case where some or many ONUs may share the same sub-band, an OLT receiver according to the present embodiments may further be configured to include a TDM burst receiver for multi-band coherent detection.

ONU Transmitters

As described above, the present coherent TFDM-PON may be configured to implement multiple types of ONUs within the network using different respective subscribed bandwidths. Accordingly, for each different type of ONU, the respective ONU-side transmitter in may also differ from one another. However, in the case where a particular ONU transmitter is capable of generating multiple sub-bands the configuration and operation of such multi-band ONU transmitters will be similar to that of transmitter 402 and scheme 400, FIG. 4. That is, the particular multi-band ONU transmitter may generate two or more sub-bands for an ONU that subscribes for more bandwidth. That is, for the generation of K sub-bands, the required bandwidth for signal generation, processing, and modulation at the ONU-side transmitter will be only K/N of the full bandwidth.

Thus, the structure and operation of the ONU-side transmitter is substantially similar to OLT-side transmitter 402, except that at the OLT-side, K=N. The structure and operation of the ONU-side transmitter may be different though, in the case where only a single sub-band is generated, as described further below with respect to FIG. 7.

FIG. 7 is a schematic illustration of a single sub-band modulation scheme 700 for a transmitter 702 of ONUs 206, FIG. 2. More particularly, scheme 700 illustrates a case where only one sub-band is used at the ONU-side for signal modulation and mapping. Accordingly, transmitter 702 is similar to transmitter 402, FIG. 4, and includes a laser source 704, a modulator 706, and a processor 708 to output and upstream signal 710. Processor 708 is also similar to processor 408, FIG. 4, and includes a data source 712, a first mapping unit 714 (e.g., for QAM mapping), a second mapping unit 716 (e.g., for sub-band mapping), a pulse shaping unit 718, and a DAC 720. Different from processor 408, however, processor 708 requires no serial-to-parallel converter, which simplifies both the cost and operating requirements of transmitter 702. Transmitter 702 otherwise operates similarly to transmitter 402, however required bandwidth for signal generation, processing, and modulation at ONU transmitter 702 need only be K/N of the full bandwidth.

The embodiments described herein were modeled and simulated to demonstrate proof-of-concept, and the corresponding verification results are described further below with respect to FIGS. 8-13C.

FIG. 8 is a schematic illustration of an exemplary simulation model 800 of a coherent TFDM-PON. More particularly, simulation model 800 is configured to verify operation of the exemplary TFDM-PON depicted in FIG. 2, accordingly, similar to system 200, FIG. 2, simulation model 800 included a 100G central OLT transceiver 802, a splitter 804, and n ONUs 806 (in the simulation model, n=4) in communication over an optical fiber 808. System 800 differed, however, from system 200, in that ONUs 806(1) and 806(2) were 50G transceivers, and ONUs 806(3) and ONU 806(n) were 100G transceivers to support a 100G coherent TFDM-PON transmission signal 810 having two sub-bands 812.

In operation of simulation model 800, the downstream receivers (not separately shown) of the 50G ONUs (i.e., ONUs 806(1) and 806(2)) detected one sub-band, and the corresponding ONU transmitters thereof (also not shown) generated only one sub-band each for the upstream signals. In contrast, the receivers of the 100G ONUs (i.e., ONUs 806(3) and 806(n)) were each able to detect two downstream sub-bands, and their corresponding ONU transmitters were each able to generate two sub-bands in the upstream. Allocation of LOs and frequency resources for simulation model 800 are described further below with respect to FIG. 9.

Figure 9:
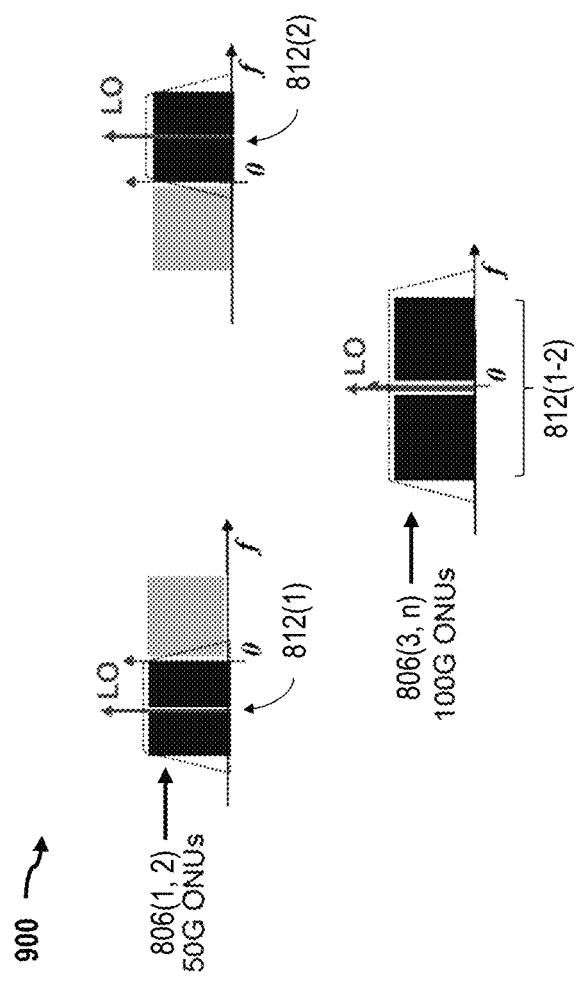
FIG. 9 depicts an allocation scheme for frequency resources and local oscillators of the simulation model depicted in FIG. 8.

FIG. 9 depicts an allocation scheme 900 for frequency resources and LOs of simulation model 800, FIG. 8. Scheme 900 thus demonstrates results similar to scheme 300, FIG. 3, except that the allocation options in scheme 900 are fewer where only two different types of ONU transceivers are used in the network, as opposed to the four different types described above with respect to scheme 300. Scheme 900 therefore illustrates the frequency resource and corresponding LO allocations in the 100G coherent TFDM-PON of simulation model 800 with respect to the two downstream sub-bands 812(1), 812(2) using only 50G ONUs (i.e., ONUs 806(1), 806(2)) and 100G ONUs (i.e., ONUs 806(3), 806 (4)).

In operation of simulation model 800, scheme 900 demonstrates how the lower-speed 50G ONU cases were able to utilize either of the two sub-bands 812(1-2) as the allocated frequency resource, thereby providing to different allocation options for both of 50G ONUs 806(1), 806(2). In contrast, the 100G ONU cases each realized only one resource allocation option (e.g., both of sub-bands 812(1-2)) for both of 100G ONUs 806(3), 806(n). The person borders skill the art will understand that even though the allocation options are fewer in scheme 900, the principles of scheme 300 still fully apply.

FIG. 10 is a graphical illustration depicting a comparative results plot 1000 of downstream receiver sensitivity for ONUs 806, FIG. 8. More particularly, plot 1000 represents the bit error rate (BER) against received optical power (in dBm) for a first subplot 1002 of a 100G single-band reference signal, a second subplot 1004 of a 100G signal averaging both 50G sub-bands 812(1-2), a third subplot 1006 of 50G left sub-band 812(1), and a fourth subplot 1008 of 50G sub-band 812(2).

In the embodiments depicted in FIGS. 10A-C, three different respective ONU setups were tested: (1) a 100G ONU capable of detecting two sub-bands (i.e., subplot 1004); (2) one type of 50G ONU capable of detecting one sub-band on the left (i.e., subplot 1006); and (3) another type of 50G ONU capable of detecting one sub-band on the right (i.e., subplot 1008). As a reference for comparison, the performance of 100G single-band signal was also tested (i.e., subplot 1002). As can be seen from the example depicted in FIG. 10, no overt penalty is observed for the different types of ONUs; all three types of ONUs demonstrate substantially the same sensitivity performance in comparison with the reference signal.

FIGS. 11A-C are graphical illustrations depicting detected signal spectrum plots 1100, 1102, 1104 for ONUs 806, FIG. 8. More particularly, plot 1100 illustrates the detected downstream signal spectrum for the 100G ONU with two sub-bands, plot 1102 illustrates the detected downstream signal spectrum for the 50G ONU with one sub-band on the right, and plot 1104 illustrates the detected downstream signal spectrum for the 50G ONU with one sub-band on the left.

FIG. 12 is a graphical illustration depicting a comparative results plot 1200 of receiver sensitivity for upstream detected signals from ONUs 806, FIG. 8. More particularly, plot 1200 represents the BER against received optical power at OLT 802 for a first subplot 1202 of the 50G ONU that only modulates the upstream signal on the left sub-band, a second subplot 1204 of the 50G ONU that only modulates the upstream signal on the right sub-band, and a third subplot 1206 of the 100G upstream optical signals from two ONUs on both of the two sub-bands. In this example, equal power on two sub-bands may be assumed. As can be seen from the example depicted in FIG. 12, receiver sensitivity of a single upstream sub-band realizes approximately 3-dB better performance than in the case using both sub-bands in the upstream.

FIGS. 13A-C are graphical illustrations depicting respective detected signal spectrum plots 1300, 1302, 1304 for respective upstream detected signals 1204, 1202, 1206, FIG. 12. More particularly, plot 1300 illustrates the detected upstream signal spectrum detected from the 50G ONU on right sub-band, plot 1302 illustrates the detected stream signal spectrum from the 50G ONU on the left sub-band, and plot 1104 illustrates the detected upstream signal spectrum from one of the 100G ONUs on the two sub-bands.

Accordingly, it can be seen from the preceding embodiments that the innovative coherent TFDM-PON solutions described herein effectively multiplex sub-bands in upstream and downstream transmissions, to efficiently utilize the advantageous properties of both time and frequency division multiplexing in the same coherent PON, as demonstrated by the simulation results described above.

Moreover, the present coherent TFDM-PON systems and methods support both asymmetric ONU/OLT hardware set-ups, and also a desirable pay-as-you-go ONU cost capability based on the particular bandwidth subscription. The present techniques therefore demonstrate a significant improvement over conventional WDM-PON or TWDM-PON systems. For example, in the TFDM-PON of the present embodiments, all the ONUs and OLT may be configured to work at the same wavelength grid with a small frequency tuning. The utilization of coherent detection wavelength selective features thus eliminates the need for optical filtering or wavelength selective components for frequency selection.

The innovative coherent TFDM-PON of the present application therefore demonstrates still further advantages over the conventional techniques by providing more flexible bandwidth sharing with respect to both time and frequency. Furthermore, the present coherent TFDM-PON is fully compatible to existing TDM-PON system, and may operate using the power splitter-based ODN of such conventional architectures without colorful components. Through implementation of frequency division multiplexing, the overall scheduling latency in the present coherent TFDM-PON is also expected to be lower than it would be using conventional techniques.

According to the innovative systems and methods described herein, effective architectures and operation principles for a coherent TFDM-PON are provided for improved bandwidth allocation flexibility, but at a lower hardware and operational cost. Additionally, several innovative transmitter and receiver designs configurations are presented for both of the OLT-side and ONU-side transceivers, and with respect to both hardware configurations and digital processes of the relevant software modules of the processor. The modeling and verification results described above provide proof-of-concept for all of these innovative principles.

Exemplary embodiments of optical communication systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user stage.

The present embodiments are particularly useful for networks and communication systems implementing a DOCSIS protocol, and may therefore be advantageously configured for use in existing 4G and 5G networks, and also for networks compatible with new radio (e.g., 5G-NR) and future generation (e.g., 6G) network implementations. The present systems and methods may therefore be implemented with respect to DOCSIS protocols, as well as other protocols, including without limitation EPON, RFoG, GPON, and/or Satellite Internet Protocol, without departing from the scope of the embodiments herein.

Although specific features of various embodiments of the disclosure may be shown in some drawings and not in others, such illustrative techniques are for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processor (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also enables a person skilled in the art to practice the embodiments, including the make and use of any devices or systems and the performance of any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A coherent optical transmitter, comprising:
a laser source;
a data source including a data stream;
a processor including (i) a serial-to-parallel converter for converting the data stream into a plurality of parallel data streams, (ii) a modulation mapping unit configured to code and map each of the plurality of parallel data streams to a constellation of a modulation format to generate a plurality of modulated data streams, (iii) a sub-band mapping unit configured to map each of the plurality of modulated data streams to a respective sub-band modulation spectrum from a plurality of frequency sub-bands to generate a plurality of sub-band data signals, and (iv) a digital-to-analog converter configured to combine the plurality of sub-band data signals and generate a combined analog sub-band output of processed data; and
a modulator configured to modulate the combined analog sub-band output of processed data with the laser source to generate a modulated optical signal for transmission over an optical transport medium.

2. The transmitter of claim 1, comprising an optical line terminal (OLT).

3. The transmitter of claim 2, wherein the OLT comprises a 100G OLT.

4. The transmitter of claim 1, comprising an optical network unit (ONU).

5. The transmitter of claim 4, wherein the ONU comprises a 100G transceiver.

6. The transmitter of claim 1, wherein the processor is further configured to dynamically allocate first and second sub-bands of the respective sub-band modulation spectrum to first and second remote transceivers disposed opposite the transmitter with respect to the optical transport medium.

7. The transmitter of claim 6, wherein the first remote transceiver includes a first local oscillator (LO) having a first LO center frequency tuned to the first sub-band, and wherein the second remote transceiver includes a second LO having a second LO center frequency tuned to the second sub-band.

8. The transmitter of claim 7, comprising a 100G coherent transmitter, and wherein the first remote transceiver includes one of a 25G transceiver, a 50G transceiver, and a 75G transceiver.

9. The transmitter of claim 8, wherein the second remote transceiver includes one of a 100G transceiver.

10. The transmitter of claim 6, wherein the first sub-band comprises a single carrier modulation format.

11. The transmitter of claim 10, wherein the second sub-band comprises a multi-carrier modulation format.

12. The transmitter of claim 11, wherein the multi-carrier modulation format comprises at least one of orthogonal frequency division multiplexing and discrete multi-tone.

13. The transmitter of claim 6, configured for point-to-multipoint communication to the first and second transceivers.

14. The transmitter of claim 1, wherein two or more sub-bands of the plurality of sub-bands have an equal bandwidth.

15. The transmitter of claim 1, wherein two or more sub-bands of the plurality of sub-bands have different bandwidths.

16. The transmitter of claim 1, wherein the plurality of sub-bands are distributed about a base frequency corresponding to a wavelength grid for the downstream optical signal.

17. A transmitter for a coherent passive optical network (PON), comprising:
- (i) a laser source;
- (ii) a downstream processor configured to (i) map a downstream data stream to a plurality of sub-bands of a frequency spectrum for a downstream optical signal modulated with the plurality of sub-bands, and (ii) dynamically allocate first and second sub-bands of the plurality of sub-bands to first and second upstream transceivers, respectively, disposed remotely from the transmitter over an optical transport medium of the PON;
- (iii) a modulator configured to modulate the dynamically allocated first and second sub-bands with the laser source to generate a modulated optical signal as the downstream optical signal for transmission to the first and second upstream transceivers over the optical transport medium; and
- (iv) a serial-to-parallel converter for converting the data stream into a plurality of parallel data streams;
- (v) a modulation mapping unit configured to code and map each of the plurality of parallel data streams to a constellation of a modulation format to generate a plurality of modulated data streams;
- (vi) a sub-band mapping unit configured to map each of the plurality of modulated data streams to a respective sub-band modulation spectrum from the plurality of sub-bands to generate respective plurality of sub-band data signals; and
- (vii) a digital-to-analog converter configured to combine the respective plurality of sub-band data signals and generate a combined analog sub-band output of processed data.

18. A transmitter for a coherent passive optical network (PON), comprising:
- a laser source;
- a downstream processor configured to (i) map a downstream data stream to a plurality of sub-bands of a frequency spectrum for a downstream optical signal modulated with the plurality of sub-bands, and (ii) dynamically allocate first and second sub-bands of the plurality of sub-bands to first and second upstream transceivers, respectively, disposed remotely from the transmitter over an optical transport medium of the PON; and
- a modulator configured to modulate the dynamically allocated first and second sub-bands with the laser source to generate a modulated optical signal as the downstream optical signal for transmission to the first and second upstream transceivers over the optical transport medium,
- wherein the first and second sub-bands have different respective modulation formats.

* * * * *